July 2, 1935.  W. M. HAHNEMANN  2,006,918

SYSTEM FOR LANDING AIRCRAFT

Filed Dec. 6, 1933

Inventor:
Walter Max Hahnemann
by R. C. Hopgood
Attorney

Patented July 2, 1935

2,006,918

UNITED STATES PATENT OFFICE 2,006,918

SYSTEM FOR LANDING AIRCRAFT

Walter Max Hahnemann, Berlin-Marienfelde, Germany, assignor to C. Lorenz Aktiengesellschaft, Berlin-Tempelhof, Germany, a company Application December 6, 1933, Serial No. 701,241
In Germany March 31, 1932

3 Claims. (Cl. 250—11)

It is a well-known method to cause ultra-short wave transmitters to radiate in several directions in order to enable aeroplanes to ascertain their position. For instance, different signals are to such end radiated in the several directions. The radiation, however, is hitherto so steeply directed upwards that the aircrafts are not able to descend along one slip-curve of constant field strength.

The invention, however, enables them to do so. The invention is further concerned with the arrangements provided on the airplanes and serving to receive the radiation emitted by the sender. The novel receiving device is adapted to indicate the field intensity in which the aircraft is moving and at the same time to allow of ascertaining the direction in which the sender is located.

In this way, with a non-directional working of the sender a good landing is provided for as regards descending along the slip-curve as well as following the correct direction.

Figure 1:
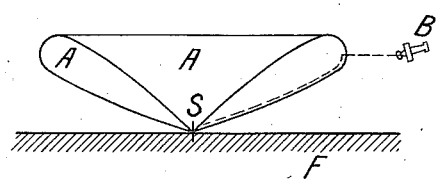
Figure 2:
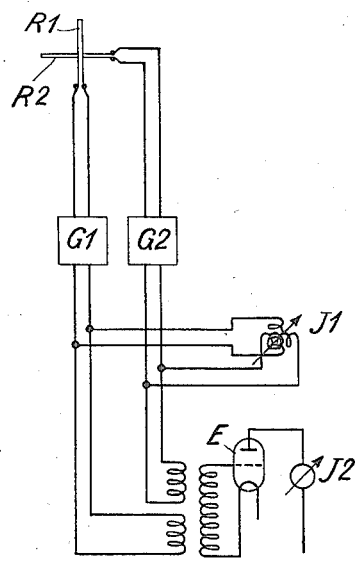

The invention will be fully understood from the following description and be particularly pointed out in the appended claims, reference being had to the accompanying drawing in which Fig. 1 is a diagram of the radiation of the sender, Fig. 2 a wiring diagram of the receiving device to be disposed on an airplane.

As shown in Fig. 1, the radiation forms a torus A that extends around the sender S. The radiation is thus in all directions as equal as possible. The aircraft B is intended to descend along the lower face of the torus, i. e. the face opposite the earth F. The slip- or landing curve is indicated by a dotted line.

The radiation can be produced by means of reflectors or dipole arrangements. The reflectors are preferably let into the earth. The dipole arrangements may be located vertical or horizontal.

The receiving device according to Fig. 2 has a cross-coil aerial composed of two frame aerials R1, R2. The frame R1 is connected to an arrangement G1, the frame R2 connected to an arrangement G2. The arrangements G1, G2 each contain a rectifier. The requisite high frequency stages and other auxiliary means form no part of the invention and are therefore not shown. The output circuits are connected to a crossed-coil instrument J1 and connected also to an instrument J2 included in the anode circuit of an electron tube E.

In the instrument J1, in accordance with the energy taken up by the device R1, R2 fields are generated under the action of which the deflection of the pointer of this instrument enables the pilot to ascertain the direction in which is located the sender producing the radiation. The instrument J2, however, is insensitive to the directional effect originated in the device R1, R2. The energies arriving over the device R1, R2 are merely summed in the instrument J2, in order to indicate the strength of the field in which the aeroplane is moving. The inlet circuits are to such end acting in the same sense on the tube E. The instrument J2 thus enables the aircraft to descend along one slip-curve of constant field strength.

The indication of the energy sum or field intensity may serve also the purpose of guiding airplanes by means of the well-known a-n- method or a similar method.

The antenna system intended for directional working may consist of dipoles disposed instead of the frames R1, R2, these dipoles being arranged to cross each other.

With the radiation according to Fig. 1 the antenna system R1, R2 enables the pilot to ascertain, by means of one of the well-known direction-finding methods, the direction in which the sender is located, and then the aircraft may descend in compliance with the indications of the instrument J2, as is usual with the slip-way beacons.

Changes may be made within the scope indicated by the appended claims, without departing from the spirit of the invention.

What is claimed is:

1. In a system for landing aircraft, the combination of a sender and means to cause it to produce a torus-shaped radiation, a receiver on the aircraft comprising an antenna system responsive in different directions for directional working and two indicating instruments connected thereto, means for causing one of said instruments to respond to differences of the received field intensities thereby to indicate the direction in which said sender is located, and means for causing the other of said instruments to respond to the sum of the received field intensities to indicate the height of the aircraft above ground, the lower face of said torus defining a slip-curve for the descent of the aircraft.

2. In a system for landing aircraft, the combination of a sender and means to cause it to produce a torus-shaped radiation, a receiver on the aircraft comprising a directional antenna formed of two crossed aerials, a crossed coil indicating instrument having its coils coupled to the respective crossed aerials, an electron tube having its input coupled to both crossed aerials, an indicating instrument insensitive to directional effects connected in the anode circuit of said electron tube, and rectifiers connected between said first-mentioned indicating instrument and the antenna system, and between said electron tube and said antenna system, the lower face of said torus defining a slip-curve for the descent of the aircraft.

3. In a system for landing aircraft, the combination of a sender and means to cause it to produce a torus-shaped radiation, a receiver on the aircraft comprising a directional antenna system composed of two crossed coil frame aerials, two indicating instruments, means for so connecting one of the instruments to said frame aerials as to respond to differences of the received field intensities thereby to indicate the direction in which the sender is located, and means for so connecting the other of said instruments to said frame aerials as to cause it to respond to the sum of the received field intensities thereby to indicate the height above ground, the lower face of said torus defining a slip-curve for the descent of the aircraft.

WALTER MAX HAHNEMANN.